Patented Jan. 2, 1940

2,185,247

UNITED STATES PATENT OFFICE 2,185,247

STABILIZED ALKALI METAL ALCOHOLATES

George Lewis Cunningham and Richard Sewall Robinson, Niagara Falls, N. Y., assignors to The Mathieson Alkali Works, Inc., New York, N. Y., a corporation of Virginia No Drawing. Application March 26, 1938, Serial No. 198,274

8 Claims. (Cl. 23—250)

This invention relates to stabilized alkali metal alcoholates. More particularly, it provides solid alkali metal alcoholates, and alcohol solutions containing alkali metal alcoholates which are stabilized against oxidation and polymerization.

It is well-known that alkali metal alcoholates, the sodium alcoholates, for example, and alcoholic solutions containing such alcoholates are very unstable under normal conditions of storage and use. In the solid form, such compounds are hygroscopic, and, further, whether in the solid form or in alcoholic solution, are desctroyed by absorption of acidic gases, such as $CO_2$, $SO_2$ and $H_2S$ from the surrounding atmosphere. While it has been possible by the exercise of proper precautions to eliminate to a considerable extent the two just mentioned difficulties, it has not been possible to avoid a large and serious degree of degradation apparently due to oxidation, particularly with alcoholates containing more than one carbon atom. This degradation resulting from absorption of oxygen from the air manifests itself visibly by the presence of a red gummy material which at the inception of the decomposition frequently possesses a light straw color. In addition to such degradation products, aldehydes and acids corresponding to the alcoholates are formed in varying proportions as a result of oxidation. Even when the alcoholate is dissolved in alcohol and kept in a tightly stoppered bottle filled to the neck, the deterioration occurs with considerable rapidity as is evidenced by the appearance of a red color in the container within a period ranging from one to four days. It is believed that the products possessing the red color are gums or resins formed by the polymerization of aldehydes which resulted from oxidation of the alcoholate.

We have found that an alkali metal alcoholate stabilized against deterioration of the type just described may be produced by mixing an appropriate catalytic anti-oxidant with the alcoholate. It is an object of the present invention therefore to provide an alkali metal alcoholate composition which is free from the objectionable tendency to oxidize or to polymerize to form gums or resins. Such improved compositions are prepared in accordance with the present invention by admixing with the solid alcoholate, or by introducing into an alcoholic solution of the alcoholate, certain suitable catalytic antioxidants hereinafter more fully described, or mixtures of such antioxidants. The present invention embraces stabilized alkali metal alcoholates whether in solid form or in alcoholic solution; and if in alcoholic solution whether the stabilization is accomplished by adding the stabilizing agent to an alcoholic solution already containing an alcoholate, or is added to the alcohol in which the alcoholate is to be prepared.

The stabilizing compounds of the present invention, which apparently function by virtue of their ability to prevent oxidation of the alcoholate or polymerization or both, are numerous. It is known that various types of compounds and products, both of synthetic and natural origin, other than the alcoholates, may be made increasingly resistant to decomposition reactions resulting from exposure to air or other oxygen containing atmospheres by the addition of certain reagents frequently referred to as "antioxidants." So far as we are aware, however, the stabilization of alkali metal alcoholates by the addition of small proportions of stabilizing agents has never been proposed. It is to be particularly noted that many of the compounds which have been proposed to stabilize various other substances against oxidation do not serve that function with respect to alcoholates. In fact, certain compounds which are generally referred to as antioxidants with respect to other materials actually serve as pro-oxidants for alcoholates and greatly accelerate their deterioration.

By the term "catalytic antioxidant" as used herein, we intend to refer to compounds of the types described below. As previously stated, the stabilizing agents of the present invention appear to function by virtue of their ability to prevent oxidation of the alcoholates to aldehydes, or by their anticatalytic effect to prevent polymerization. We do not, however, predicate our invention on this or any other hypothesis, but upon the observed fact of improved alcoholate stability when the stabilizing agents of the present invention are admixed therewith.

One class of organic compounds which we have found to be generally effective as stabilizers includes primary, secondary and tertiary amines, diamines and unsaturated amines. These may be aliphatic or aromatic amines whose aliphatic or aromatic constituents may have substituent groups attached, provided, however, that such substituents are not pro-oxidant groupings which cause the entire compound to exert a pro-oxidant effect. The nitro group is such a pro-oxidant substituent whose pro-oxidant properties seem to be stronger than the antioxidant properties of the amine group. Thus, although aniline is a satisfactory stabilizing agent according to the present invention, the nitroanilines are pro-oxidant compounds and cause the alcoholates to deteriorate even more rapidly than they do normally. Typical examples of such amino compounds which we have found to be effective in stabilizing alkali metal alcoholates are: methyl amine, ethyl amine, ethylene diamine, hydroxyl amine, hydrazine, triethanol amine, aniline, the chloroanilines, meta- and para-phenylene diamine, benzyl amine, and piperidine. The hydrochlorides of the amines may be used if desired. In certain instances where the amine is somewhat volatile and difficult to handle the hydrochlorides are particularly advantageous. The use of hydrochlorides has the added advantage that they are easily prepared and kept in an anhydrous condition, whereas this is often difficult with the free amine. As is indicated below, the proportion of the stabilizer added is so small that the presence of the hydrochloride group which reacts with the basic alcoholate does not introduce any serious loss of alcoholate.

In addition to the just recited examples of amine stabilizing agents, organic compounds containing the $NH_2$ group and not containing a predominating prooxidant group are satisfactory stabilizing agents according to the present invention, and are referred to herein as amines and amides, although systems of nomenclature or other properties of the compound sometimes cause such compounds to be classified otherwise than as amines. Examples of such compounds are: formamide, glycine and its hydrochloride, glycine ethyl ester and its hydrochloride and sulfanilic acid.

Further examples of organic compounds which function as stabilizing agents for alkali metal alcoholates according to the present invention, and which do not contain amino or imino groups are: formaldehyde, ethyl butyrate, ethyl acetoacetate, betanaphthol, and d-mannitol.

As indicated above it has been found that many compounds act as pro-oxidants with respect to alcoholates and greatly accelerate their decomposition and polymerization; such substances include organic compounds having nitro, phenolic, and carboxylic (in the absence of amino groups) substituents. Examples of such compounds are: succinic acid, picric acid, pyrogallic acid, nitro and dinitrobenzene, the nitro anilines, hydroquinone, and acetophenone. Certain organic salts, such as quinine sulfate; soaps of heavy metals, such as copper oleate; and inorganic salts of copper, manganese, nickel and iron have also been found to act as pro-oxidants.

The proportion of stabilizing agent which produces optimum results with a given amount of an alcoholate may vary somewhat depending on such variable factors as: (1) the relative time the material is exposed to air, or other oxidizing atmosphere; (2) the stabilizer used; and (3) the temperature at which the alcoholate is to be kept. Certain stabilizing agents are somewhat more efficient than others and therefore may be present in slightly less quantities. The higher the temperature at which the composition is to be kept the greater is the tendency to oxidize and polymerize; somewhat increased proportions of stabilizing agent may thus be required. In general, we have found that alkali metal alcoholates, or alcoholic solutions of such alcoholates, containing the stabilizing agent in an amount between .05% and about 2% based on the weight of the alcoholate are preserved against deterioration due to oxidation or polymerization for long periods of time. It has been observed that an added stabilizing power is frequently attained when a mixture of stabilizing agents is used, the total proportions of the mixture, however, remaining within the stated limits. An amount of the stabilizing agent in excess of 2% does not in general appear to produce any added advantage, and in some cases appears to be undesirable.

In order to stabilize an alcoholic solution of an alkali metal alcoholate, the stabilizing agent should be added to the solution as soon as possible after the preparation of the alcoholate or after the alcoholate has been dissolved therein. It will be apparent that the alcohol used should be substantially free of aldehydes or traces of prooxidants, such as copper, nickel or iron. While the stabilizing agent may be added to the alcoholate solution, as just indicated, it may also advantageously be added to the alcohol prior to the preparation of an alcoholate therein. Thus alkali metal alcoholates prepared as described in United States Patent 2,069,403, granted to one of us February 2, 1937, may be stabilized by the addition of a catalytic antioxidant to the alcoholic solution of the alcoholate, or the antioxidant may be added to the alcohol prior to its reaction with the amalgam.

The following experimental example will serve to illustrate the preparation of a stabilized alcoholate solution made in accordance with the referred to patent.

*Example I.*—1 gram of ethylene diamine was added to 1000 cc. of absolute ethyl alcohol. This mixture was reacted with 0.3% sodium amalgam in the presence of a graphite grid until 65 grams of sodium had reacted. The stabilized ethyl alcohol solution of sodium ethylate was separated from the sodium amalgam. A sample of this solution remained water white without any indication of oxidation or polymerization for a period of eleven months during which it was kept under observation. Another sample of sodium ethylate dissolved in ethyl alcohol prepared at the same time as a blank did not contain the stabilizing agent. This solution assumed a straw coloration after two days standing, and after four days became red with distinct traces of a resinous substance clearly visible in the tube. Other samples of alcoholate dissolved in alcohol in which the stabilizing agent was added immediately after the preparation of the alcoholate have also remained stabilized for long periods of time.

*Example II.*—Another sample of sodium ethylate dissolved in ethyl alcohol was prepared in the same manner using the same quantities of reagents as in Example I, with the exception of the stabilizing agent. In this case 0.25 g. ethyl amine and 0.25 g. ethylene diamine was added to the absolute ethyl alcohol. In this mixture, due to the presence of the mixed stabilizing agent only one-half the quantity was necessary to produce an equivalent degree of stabilization.

We have further found that the alcoholate stabilizing agents of the present invention are with advantage incorporated in alcoholic potassium hydroxide solutions with the result that the formation of oxidation and polymerization products is prevented. It is well known that alcoholic solutions of KOH such as, for example, those used to determine saponification numbers, decompose on standing. Such an objectionable property necessitates frequent standardization of the solutions, or the mixing and standardization of fresh solutions for each determination. When potassium hydroxide is dissolved in alcohol an equilibrium is established as follows:

$$KOH + C_2H_5OH = C_2H_5OK + H_2O$$

It seems probable therefore that the stabilizing effect which we have observed when the herein described catalytic antioxidants are included in an alcoholic solution of KOH, is a result of the inhibition of the tendency of the potassium alcoholate to oxidize to aldehyde and polymerize. The following example will indicate the manner in which such a solution may be stabilized in accordance with the present invention.

*Example III.*—30 grams of pure KOH were dissolved in 1 liter of 95% ethyl alcohol which had been redistilled from NaOH. ¼ gram of ethylene diamine was added. The solution was thoroughly mixed and allowed to stand until all the precipitated carbonate settled out. The clear solution was poured off for use. A solution of similar concentration was prepared, but without the stabilizing agent. This solution evidenced a tendency to decompose, and become colored in a relatively short time. The solution containing the ethylene diamine, however, remained stable and colorless for a long period of time.

The stabilized solid alkali metal alcoholates of the present invention are more difficult of preparation due to the mechanical difficulties involved in properly admixing such small quantities of the stabilizing agents therewith. According to the usual practice, solid alcoholates are prepared by evaporating excess alcohol from an alcoholic solution of the alcoholate. During such evaporation the stabilizing agent also is usually removed. We have found that the catalytic antioxidants of the present invention may be admixed with solid alcoholates in a degree sufficient to prevent their deterioration, by dissolving the solid alcoholate and the antioxidant in a solvent of high volatility such as, for example, liquid ammonia, or ethyl ether. The following example illustrates a stabilized solid alcoholate composition according to this embodiment.

*Example IV.*—1 gram of ethyl amine was dissolved in 250 grams of liquid ammonia. 100 grams of sodium ethylate were then dissolved in this solution. The liquid ammonia was evaporated off leaving a stabilized sodium alcoholate composition as a residue.

We claim:

1. A stabilized alkali metal alcoholate comprising the alcoholate and a minor proportion of a catalytic antioxidant selected from the class consisting of amines, amine hydrochlorides and amides, each of which is free of substituent groups which exert a pro-oxidant effect.

2. A stabilized alkali metal alcoholate comprising the alcoholate and a minor proportion of a mixture of catalytic antioxidants selected from the class consisting of amines, amine hydrochlorides and amides, each of which is free of substituent groups which exert a pro-oxidant effect.

3. A stabilized alkali metal alcoholate comprising the alcoholate and a minor proportion of a catalytic antioxidant selected from the class consisting of amines, amine hydrochlorides and amides, each of which is free of substituent groups which exert a pro-oxidant effect, the amount of the antioxidant ranging from 0.05% to about 2% by weight of the alcoholate.

4. A stabilized substantially dry solid alkali metal alcoholate composition comprising the solid alcoholate having distributed therethrough a minor proportion of a catalytic antioxidant selected from the class consisting of amines, amine hydrochlorides and amides, each of which is free of substituent groups which exert a pro-oxidant effect.

5. A stabilized alcoholic solution of an alkali metal alcoholate which comprises an alcohol having dissolved therein the alkali metal alcoholate together with a minor proportion of a catalytic anti-oxidant selected from the class consisting of amines, amine hydrochlorides and amides, each of which is free of substituent groups which exert a pro-oxidant effect.

6. A stabilized alkali metal alcoholate composition comprising the alcoholate and ethylene diamine in an amount ranging from 0.05% to about 2% by weight on the alcoholate.

7. A stabilized alkali metal alcoholate composition comprising the alcoholate and ethyl amine in an amount ranging from 0.05% to about 2% by weight on the alcoholate.

8. A stabilized alkali metal alcoholate composition comprising the alcoholate and glycine in an amount ranging from 0.05% to about 2% by weight on the alcoholate.

GEORGE LEWIS CUNNINGHAM.
RICHARD SEWALL ROBINSON.